United States Patent
Miyata (10) Patent No.: US 9,788,335 B2
(45) Date of Patent: Oct. 10, 2017

(54) COMMUNICATION APPARATUS AND COMMUNICATION CONTROL METHOD

(71) Applicant: KYOCERA Corporation, Kyoto-shi, Kyoto (JP)

(72) Inventor: Takeo Miyata, Toyonaka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/786,557

(22) PCT Filed: Apr. 21, 2014

(86) PCT No.: PCT/JP2014/002245
§ 371 (c)(1),
(2) Date: Oct. 23, 2015

(87) PCT Pub. No.: WO2014/174831
PCT Pub. Date: Oct. 30, 2014

(65) Prior Publication Data
US 2016/0073418 A1    Mar. 10, 2016

(30) Foreign Application Priority Data

Apr. 25, 2013 (JP) .................................. 2013-092604

(51) Int. Cl.
*H04W 72/08* (2009.01)
*H04B 7/06* (2006.01)

(52) U.S. Cl.
CPC ........ *H04W 72/085* (2013.01); *H04B 7/0697* (2013.01)

(58) Field of Classification Search
CPC .................................................. H04W 72/085
See application file for complete search history.

(56) References Cited

U.S. PATENT DOCUMENTS

| | | |
|---|---|---|
| 7,209,765 B1 | 4/2007 | Hayase et al. |
| 7,460,494 B2 | 12/2008 | Sandhu |
| 8,116,241 B2 | 2/2012 | Shimizu et al. |
| 8,565,253 B2 | 10/2013 | Sandhu |
| 2005/0041611 A1 | 2/2005 | Sandhu |
| 2006/0153098 A1 | 7/2006 | Shimizu et al. |

(Continued)

FOREIGN PATENT DOCUMENTS

| | | |
|---|---|---|
| JP | 2004-229088 A | 8/2004 |
| JP | 2006-197207 A | 7/2006 |

(Continued)

OTHER PUBLICATIONS

International Search Report mailed Jun. 10, 2014, corresponding to International application No. PCT/JP2014/002245.

(Continued)

*Primary Examiner* — John Blanton
(74) *Attorney, Agent, or Firm* — Hauptman Ham, LLP (57) ABSTRACT

A communication apparatus 101 having a plurality of antennas includes a controller that, in radio communication with another communication apparatus 103 on a plurality of channels by applying SDMA (Space Division Multiple Access), acquires information on communication performance of the another communication apparatus 103 and, based on the information, controls the radio communication that employs the SDMA.

9 Claims, 3 Drawing Sheets (56) References Cited

U.S. PATENT DOCUMENTS

| | | |
|---|---|---|
| 2007/0081450 A1 | 4/2007 | Hayase et al. |
| 2009/0147879 A1 | 6/2009 | Sandhu |
| 2009/0325514 A1 | 12/2009 | Shimizu et al. |
| 2011/0299480 A1* | 12/2011 | Breit .................... H04B 7/0626 370/329 |

FOREIGN PATENT DOCUMENTS

| | | |
|---|---|---|
| JP | 2007-502071 A | 2/2007 |
| JP | 2007-110317 A | 4/2007 |
| JP | 2009-111782 A | 5/2009 |

OTHER PUBLICATIONS

Kenta Okino et al. "Mobility Improvement Effects of Adaptive Antenna Array applied to Mobile Station in SDMA system", IEICE Technical Report, vol. 105 No. 622, pp. 65-68.
Written Opinion mailed Jun. 10, 2014, corresponding to International application No. PCT/JP2014/002245.
Office Action in JP Application No. 2013-092604, mailed Feb. 21, 2017.

\* cited by examiner

COMMUNICATION APPARATUS AND COMMUNICATION CONTROL METHOD

CROSS REFERENCE TO RELATED APPLICATION

This application is a National Phase of International Application Number PCT/JP2014/002245, filed Apr. 21, 2014, and claims priority to and the benefit of Japanese Patent Application No. 2013-092604 filed on Apr. 25, 2013, the entire contents of which are incorporated herein by reference.

TECHNICAL FIELD

This disclosure relates to a communication apparatus and a communication control method.

BACKGROUND

As communication schemes achieving an improvement in communication performance, there have been known an LTE (Long Term Evolution) system, an XGP (eXtended Global Platform) system, and a WiMAX (Worldwide Interoperability for Microwave Access) (registered trademark) system.

Conventionally, as a technique for improving a communication service in such systems, a MIMO (Multiple Input Multiple Output) technology has been proposed.

The MIMO technology is a technology that, by combining a plurality of transmission antennas and a plurality of reception antennas, forms a plurality of channels (communication channels) between transmission and reception. As an example of the MIMO technology, a communication apparatus on a transmission side (for example, a base station), by using the same radio resource, transmits a plurality of signals respectively having different data from a plurality of transmission antennas. Then, a communication apparatus on a reception side (for example, a communication terminal) receives the plurality of signals by using a plurality of reception antennas, separates the signals, and extracts the data.

In recent years, in addition to the communication schemes described above, application of SDMA (Space Division Multiple Access) (or MIMO-SDMA) has been considered or put into practical use (for example, see PLT 1 set forth below).

In a system applying the SDMA, for example, a base station serving as the communication apparatus assigns the same carrier (in the same frequency band) in the same time slot, i.e., the same radio resource to a plurality of communication terminals. In this system, in order to prevent interference between signals transmitted in the same radio resource, an adaptive array technique, for example, is employed. The base station, by performing beam control (beam forming) and null control (null steering) of the adaptive array technique, may transmit the signal to a communication terminal of interest alone. Also, the base station, when receiving a plurality of signals transmitted in the same radio resource from a plurality of communication terminals, may extract a signal from the communication terminal of interest. Since a plurality of communication terminals may use the same radio resource, utilization efficiency of the radio resource is improved.

CITATION LIST

Patent Literature

PLT 1: JP2007110317A

SUMMARY

Technical Problem

However, the SDMA uses the same resource and thus has a problem that characteristics thereof are prone to significant fluctuations depending on a radio channel condition. The radio channel condition includes, for example, a cross-correlation (a spatial correlation) and a reception level difference (a received power difference) between signals transmitted from a plurality of communication terminals or transmitted by one radio terminal on a plurality of channels. A high cross-correlation and a significant reception level difference makes it difficult to separate a plurality of signals in the same radio resource. In this case, the base station determines that the radio communication employing the SDMA is inapplicable to the communication terminal.

In order to widen an application range of the SDMA, the base station, based on information on a communication environment such as uplink communication performance information (RSSI [Received Signal Strength Indicator], CINR [Carrier to Interference and Noise Ratio], and the like) and downlink communication performance information (CIRN, an error rate, and the like), may carry out adaptive modulation control, transmission power control, channel selection control, and the like.

Signal processing such as the adaptive array technique and the like those involving a workload is generally carried out by the base station and thus has not often been employed by the communication terminal. However, recent improvements in a radio signal processing technology and a semiconductor technology have led to the introduction of a communication terminal (or a repeater or a wireless router) having high performance and capable of reducing the interference. Therefore, at the time of determination of the applicability of the SDMA based on radio communication performance of a conventional communication terminal having no interference reduction function, even when the SDMA is applicable due to the interference reduction function of the communication terminal, it may be determined that the SDMA is inapplicable in terms of the communication environment.

Accordingly, in view of the above problem, it could be helpful to provide a communication apparatus and a communication control method those capable of improving frequency utilization efficiency by applying the SDMA.

Solution to Problem

In order to solve the above problems, a communication apparatus according to a first aspect of the disclosure is a communication apparatus having a plurality of antennas, including:

a controller, in radio communication with another communication apparatus on a plurality of channels by applying SDMA (Space Division Multiple Access), for acquiring information on communication performance of the another communication apparatus and, based on the information, controlling the radio communication that employs the SDMA.

A second aspect of the disclosure is the communication apparatus according to the first aspect, wherein the controller, based on the information, determines whether the another communication apparatus has an interference reduction function and, when there is a high-performance communication apparatus having the interference reduction function, eases an application condition of SDMA for the high-performance communication apparatus.

A third aspect of the disclosure is the communication apparatus according to the second aspect, wherein there are a plurality of other communication apparatuses.

A fourth aspect of the disclosure is the communication apparatus according to the third aspect, wherein, when the plurality of other communication apparatuses includes a low-performance communication apparatus having no interference reduction function, and a relation between the low-performance communication apparatus and the high-performance communication apparatus satisfies the application condition, the controller in transmission to the high-performance communication apparatus, carries out null control alone to the low-performance communication apparatus, and in transmission to the low-performance communication apparatus, carries out beam control alone to the low-performance communication apparatus.

A fifth aspect of the disclosure is the communication apparatus according to the third aspect, wherein, when the plurality of other communication apparatuses includes a low-performance communication apparatus having no interference reduction function, a reception level of a signal from the low-performance communication apparatus is lower than a reception level of a signal from the high-performance communication apparatus, and a relation between the low-performance communication apparatus and the high-performance communication apparatus satisfies the application condition, the controller reduces a transmission level of a signal transmitted to the high-performance communication apparatus and, simultaneously, increases a transmission level of a signal transmitted to the low-performance communication apparatus.

A sixth aspect of the disclosure is the communication apparatus according to the third aspect, wherein the application condition is having a difference between reception levels of signals from the plurality of other communication apparatuses smaller than a reception level threshold, and the controller eases the application condition by increasing the reception level threshold.

A seventh aspect of the disclosure is the communication apparatus according to the third aspect, wherein the application condition is having a cross-correlation of the signals from the plurality of other communication apparatuses smaller than a correlation threshold, and the controller eases the application condition by increasing the correlation threshold.

An eighth aspect of the disclosure is the communication apparatus according to the third aspect, wherein, when there are a plurality of other communication apparatuses satisfying the application condition, the controller preferentially applies the SDMA to the high-performance communication apparatus.

Although the apparatus has been described above as the solution of the disclosure herein, a method, a program, and a storage medium storing the program those substantially corresponding to the apparatus may implement the disclosure and thus are included in the scope of the disclosure.

For example, a communication control method according to a ninth aspect implementing the disclosure herein as a method is a communication control method of a communication apparatus having a plurality of antennas, wherein, when the communication apparatus carries out a radio communication with another communication apparatus on a plurality of channels by applying SDMA (Space Division Multiple Access), the communication apparatus carrying out:

a step of acquiring information on communication performance of the another communication apparatus; and a step of controlling, based on the information, the radio communication that employs the SDMA.

Advantageous Effect

According to the communication apparatus and the communication control method of the disclosure herein as described above, frequency utilization efficiency may be improved by applying the SDMA.

DETAILED DESCRIPTION

Hereinafter, an embodiment applying a communication apparatus of the disclosure to a base station will be described with reference to the accompanying drawings. Note that the communication apparatus of the disclosure is applicable to, other than the base station, a relaying apparatus (a repeater), for example.

Figure 1:
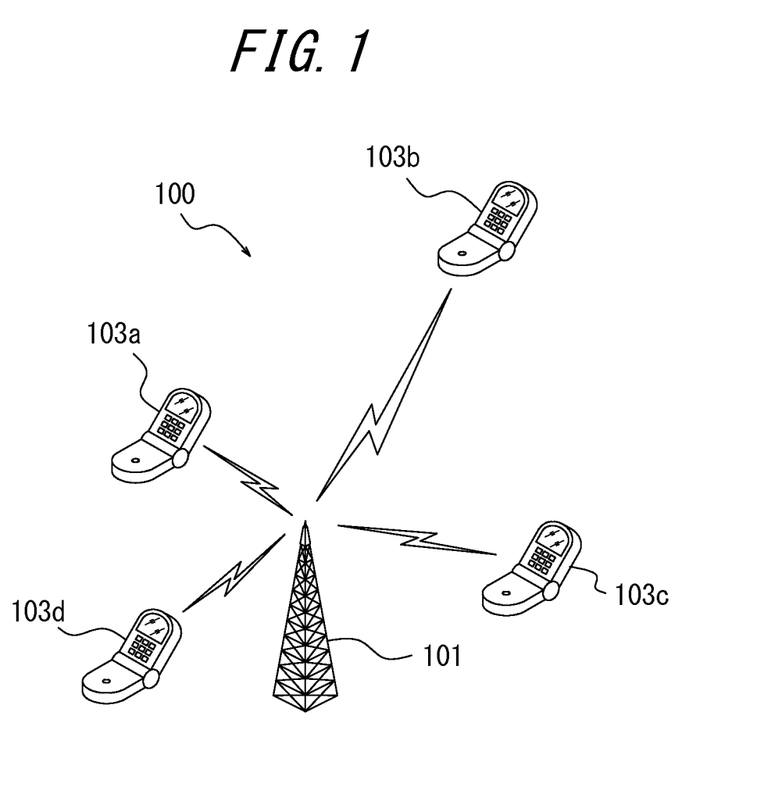
FIG. 1 is a diagram illustrating a schematic configuration of a communication system according to one embodiment.

FIG. 1 is a diagram illustrating a schematic configuration of a communication system according to one embodiment of the disclosure. A communication system 100 includes a base station 101 and a plurality of communication terminals (other communication apparatuses) 103 (103a, 103b, 103c, and 103d). The communication system 100 is a system that may apply SDMA, which is one of MIMO technologies, and is, for example, an LTE system, an XGP system, or a WiMAX system. The base station 101 includes a plurality of antennas and is capable of performing, by applying the SDMA, radio communication with the communication terminals 103. That is, the SDMA is a technology that allows the base station 101 to assign, by using a radio resource with the same carrier in the same time slot, a plurality of channels to one of the communication terminals 103 (single user MIMO) or a plurality of communication terminals 103 (multi-user MIMO). The number of channels that may be assigned to the same radio resource (the same carrier in the same time slot) depends on the number of antennas of the base station 101 which, according to the present embodiment, is two, for example.

Some of the communication terminals 103 have an interference reduction function using a plurality of antennas. The interference reduction function is a technique that may, under reception control of the communication terminal itself, separate space-multiplexed signals and extract a signal (a desired wave) from the base station 101 desired by the communication terminal 103. The interference reduction function is substantialized by using a conventionally known algorithm such as, for example, IRC (Interference Reduction Control), MLD (Maximum-Likelihood Detection), LMS (Least Mean Square), RLS (Recursive Least Squares), AAS (Adaptive Antenna System), and the like. Hereinafter, the present embodiment assumes that the communication terminal 103b has the interference reduction function, and the communication terminals 103a, 103c, and 103d does not have the interference reduction function. Also, the communication terminal 103b having the interference reduction function is referred to as a high-performance communication terminal (a high-performance communication apparatus), and the communication terminals 103a, 103c, and 103d those having no interference reduction function are referred to as low-performance communication terminals (low-performance communication apparatuses). Note that a communication terminal having the algorithm for the interference reduction function but unable to reduce the interference to a predetermined level may be regarded as having no interference reduction function. The predetermined level is a matter to be appropriately determined.

Figure 2:
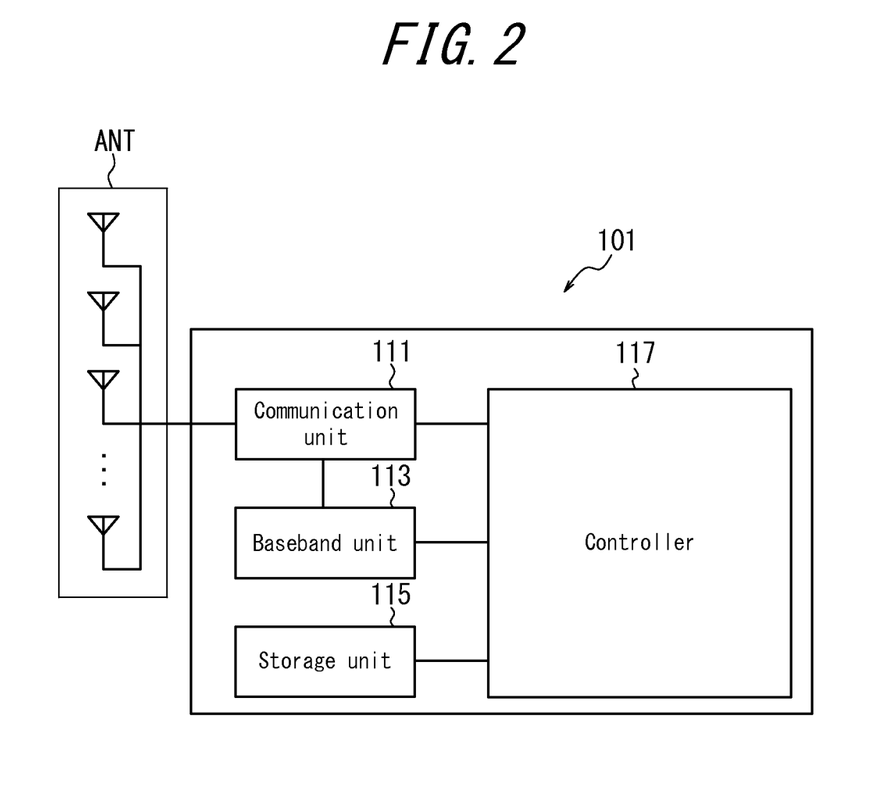
FIG. 2 is a functional block diagram illustrating a schematic configuration of a base station according to one embodiment.

FIG. 2 is a functional block diagram illustrating a schematic configuration of the base station according to one embodiment of the disclosure. The base station 101 according to the present embodiment includes a communication unit 111 having an array antenna ANT, a baseband unit 113, a storage unit 115, and a controller 117. The communication unit 111, the baseband unit 113, and the storage unit 115 are connected to the controller 117.

The array antenna ANT is made up of a plurality of antennas and capable of performing transmission directivity control such as beam control and null control. The array antenna ANT is, for example, an adaptive array antenna. The beam control is a function to concentrate a radio wave of the radio base station 101 to a desired communication terminal, that is, a function to direct the beam. Also, the null control is a function to direct a directivity valley (a null) to a direction of a communication terminal that uses a radio resource the same as that used by the desired communication terminal, in order to prevent the radio wave directed to the desired communication terminal from being emitted in the direction. The null control is a function, when one communication terminal carries out a communication by using a plurality of channels, to direct a null on one channel to the other.

The communication unit 111 exchanges data (a signal) with the communication terminal 103 via the array antenna ANT through the radio communication. The communication unit 111 carries out amplification and down-conversion with a low noise on a received signal (a reception signal) and transmits a signal thus obtained to the baseband unit 113. Also, the communication unit 111 generates a transmission signal by carrying out up-conversion and amplification on the signal from the baseband unit 113. Then, the communication unit 111, via the array antenna ANT, transmits the transmission signal to the communication terminal 103.

The baseband unit 113 demodulates the reception signal from the communication unit 111 by carrying out AD conversion and fast Fourier transformation on the reception signal and extracts the baseband signal. Then, the baseband unit 113 transmits the baseband signal to the controller 117. Also, the baseband unit 113 modulates the baseband signal from the controller 117 by carrying out inverse fast Fourier transformation and DA conversion on the baseband signal. Then, the baseband unit 113 transmits a modulated baseband signal to the communication unit 111.

The storage unit 115 stores various information including a condition to apply (an application condition of) the SDMA to the communication terminal 103 and also serves as a work memory.

The application condition is a condition indicating that, when the same radio resource is assigned to a plurality of communication terminals 103, the low-performance communication terminal may receive the signal from the base station 101 with stable quality. The application condition is, for example, whether cross-correlation and a reception level difference between signals from a plurality of communication terminals 103 are under respective thresholds. When the signals have high cross-correlation or a significant reception level difference, separation of a plurality of signals of the same radio resource becomes difficult. Therefore, when the cross-correlation between the signals is under a correlation threshold, the low-performance communication terminal may receive the signal with stable quality. Also, when the reception level difference between the signals is under a reception level threshold, the low-performance communication terminal may receive the signal with stable quality. Note that, in the disclosure herein, the application condition is not limited to one parameter (e.g., the cross-correlation) but may include a plurality of parameters such as, for example, the cross-correlation and the reception level difference. In this case, when the condition of each of the plurality of parameters is satisfied, it may be determined that the application condition is satisfied. The cross-correlation and the reception level difference are calculated by the controller 117 of the base station 101, and the reception level difference may be determined based on, for example, RSSI of the signal from the communication terminal 103 obtained by the controller 117.

The controller 117 controls and manages the entire base station 101 including each functional block thereof. The controller 117 may be constituted by using software executed by any appropriate processor such as a CPU (Central Processing Unit), or a dedicated processor (for example, DSP (Digital Signal Processor)) specialized for each operation. The controller 117 acquires information on communication performance of each of the communication terminals 103 in communication therewith. Then, the controller 117, in consideration of a communication environment between the base station 101 and the communication terminal 103 as well as the communication performance of the communication terminal 103, controls (determines) the application of the SDMA to the communication terminal 103. An application method of the SDMA will be described in detail below with reference to FIG. 3.

Figure 3:
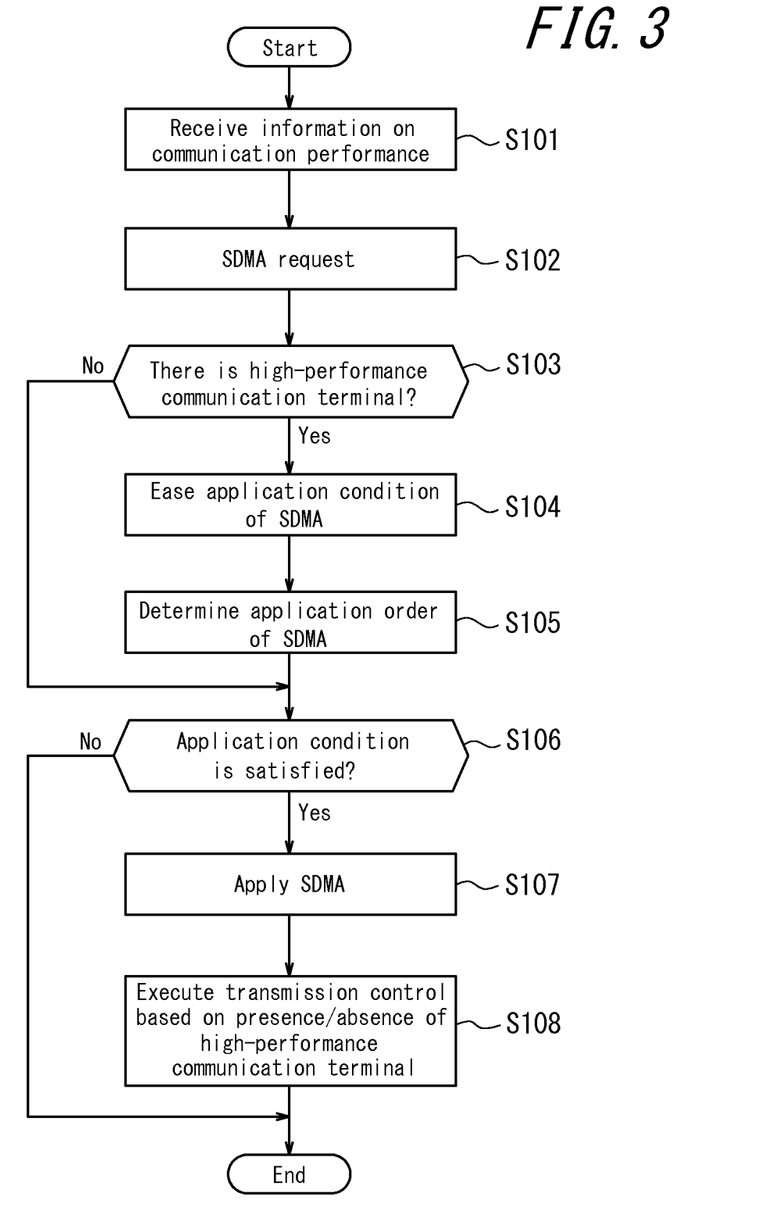
FIG. 3 is a flowchart illustrating an operation of the base station according to one embodiment.

Referring to FIG. 3, next, the operation of the base station 101 will be described. FIG. 3 is a flowchart illustrating the operation of the base station according to one embodiment of the disclosure. Hereinafter, the base station 101 is assumed as having a positional relationship with the communication terminals 103a to 103d as illustrated in FIG. 1, and the communication terminal 103b is the most remote from the base station 101. Also, distances between the communication terminals 103a, 103c, and 103d are assumed as shorter than a distance between the communication terminals 103a, 103c, and 103d and the communication terminal 103b. Further, in a description of a matter that is common to all of the communication terminals 103a to 103d, the communication terminals 103a to 103d are not distinguished therebetween but referred to as the communication terminal 103.

The communication terminal 103 in radio communication with the base station 101 transmits information on the communication performance thereof. The information on the communication performance allows determination on presence/absence of the interference reduction function and includes, for example, an identification number (ID) and a downlink communication performance information of the communication terminal. Note that the downlink communication is communication from the base station 101 to the communication terminal 103.

The identification number is information that allows unique identification of the communication terminal and, for example, IMSI (International Mobile Subscriber Identity). When the information on the presence/absence of the interference reduction function is reflected in the identification number of the terminal, the base station 101 may determine whether the communication terminal 103 has the interference reduction function by receiving (acquiring) the identification number from the communication terminal 103.

The downlink communication performance information may include, for example, a modulation class (a combination of a modulation scheme and a coding rate) used between the base station 101 and the communication terminal 103, CINR or SINR (Signal to Interference and Noise Ratio) of the reception of the communication terminal 103, an error rate (a bit error rate), the number of antennas usable for the reception of the communication terminal 103, and the like.

When, despite that the modulation class of the communication terminal 103 is below a predetermined class (that is, in a class having less bits those can be transmitted in one symbol and thus unlikely to be affected by the interference) and, also, the CINR is at a predetermined value or greater (that is, an excellent communication environment), the error rate is at a predetermined value or greater (that is, there are many errors), the base station 101 may determine that the communication terminal 103 does not have a good reception function, i.e., that the communication terminal 103 has no interference reduction function. Also, when, despite that the modulation class of the communication terminal 103 is higher than the predetermined class (that is, prone to the interference) and, also, the CINR is at the predetermined value or smaller (that is, a poor communication environment), the bit error rate is under the predetermined value, the base station 101 may determine that the communication terminal 103 has the interference reduction function. Further, when the downlink communication performance information includes information on the CINR before and after the demodulation by the communication terminal 103, the base station 101 may determine that, as the CINR after the demodulation is higher than the CINR before the demodulation, the communication terminal 103 has higher interference reduction function.

Also, in proportion to the number of antennas of the communication terminal 103 usable for the reception, accuracy of the separation of the spatial-multiplexed signal is improved. Therefore, when the communication terminal 103 has a predetermined number of antennas or more, the base station 101 may determine that the communication terminal 103 has the interference reduction function.

The predetermined values (classes) described above associated with the downlink communication performance information may be appropriately determined and preliminarily stored in the storage unit 115. Also, the downlink communication performance information may be transmitted by using a known protocol or a special protocol from the communication terminal 103 to the base station 101.

When the communication terminal 103 transmits the information on the communication performance to the base station 101, the communication unit 111 of the base station 101 receives the information and transmits the information to the controller 117 via the baseband unit 113 (step S101). Then, the controller 117 stores the information thus acquired in the storage unit 115.

Then, it is assumed that there is generated an SDMA request (step S102). The SDMA request is generated when the communication unit 111 receives, from the communication terminals 103a to 103d, the SDMA request (signal) requesting radio communication that employs the SDMA, or when the number of radio resources those may be assigned by the base station 101 decreases. Upon generation of the SDMA request, the controller 117, based on the information on the communication performance stored in the storage unit 115, determines whether there is the high-performance communication terminal among the communication terminals 103a to 103d (step S103). According to the present embodiment, since the communication terminal 103b is the high-performance communication terminal (Yes at step S103), the controller 117 proceeds to step S104.

Since the communication terminal 103b has the interference reduction function, even when receiving the signal using the SDMA in a state unsatisfying the application condition, the communication terminal 103b may extract a desired wave with stable quality. Therefore, the controller 117, depending on a reduction capability level of the interference reduction function, eases the application condition of the SDMA for the communication terminal 103b (step S104). When the application condition includes the correlation threshold or the reception level threshold, the controller 117 may increase the correlation threshold or the reception level threshold within a range that the interference reduction function may deal with (compensate).

Subsequently, the controller 117, when the number of communication terminals serving as candidates for the radio communication that employs the SDMA is greater than the number of terminals (two, according to the present embodiment) capable of performing the communication by using the same radio resource, may separate the communication terminals into groups and determine application order of the SDMA (step S105). According to the present embodiment, there are four communication terminals (communication terminals 103a to 103d) serving as the candidates for the radio communication that employs the SDMA. Therefore, the control unit 117, first, based on the cross-correlation and the reception level difference between the signals from the communication terminals 103a to 103d, separates the communication terminals into groups for the SDMA application. In particular, the control unit 117, in such a manner reducing the cross-correlation and/or a power difference, combines the communication terminals Typically, in proportion to a distance between the communication terminals, the cross-correlation thereof is likely to become lower and, as distances between the base station 101 and each of the communication terminals are shorter, the power difference of the reception signal received by the base station 101 is likely to become smaller. According to the present embodiment, therefore, the controller 117 combines the communication terminal 103a and the communication terminal 103c, and the communication terminal 103b and communication terminal 103d those being remained. Hereinafter, the combination of the communication terminals 103a and 103c and the combination of the communication terminals 103b and 103d are referred to as a group 1 and a group 2, respectively.

Subsequently, the controller 117 selects the group to apply the SDMA. The high-performance communication terminal may perform the communication that employs the SDMA in a more stable manner than the low-performance communication terminal Therefore, the controller 117 may preferentially apply the SDMA to the high performance communication terminal, that is, to a group that includes the high performance communication terminal. When a plurality of groups include the high performance communication terminals, the controller 117 may give a higher priority to a group including more high performance communication terminals.

As such, the controller 117 determines whether the group 2 including the high-performance communication terminal 103b, before the group 1, satisfies the application condition (step S106). Since an eased application condition is used for the group 2 including the high-performance communication terminal 103b, the group 2 is likely to satisfy the application condition.

When the relation (for example, the cross-correlation and the reception level difference) between the communication terminal 103b and the communication terminal 103d those constituting the group 2 satisfies the application condition (Yes at step S106), the SDMA is applied to the communication terminal 103b and the communication terminal 103d constituting the group 2 and the same radio resource is assigned thereto (step S107). Then, the controller 117, when transmitting the radio signal to the communication terminal 103b, may perform the transmission directivity control in such a manner directing the beam to the communication terminal 103b and null to the communication terminal 103d. Also, the controller 117, when transmitting the radio signal to the communication terminal 103d, may perform the transmission directivity control in such a manner directing the beam to the communication terminal 103d and the null to the communication terminal 103b.

Here, the controller 117, depending on whether there is the high-performance communication terminal 103b, may perform the transmission control other than the transmission directivity control described above (step S108). The high-performance communication terminal 103b, unlike the low-performance communication terminal 103d, is capable of extracting a desired wave (a signal to the communication terminal 103b) when the desired wave is interfered by an interference wave (a signal to the communication terminal 103d). Therefore, the controller 117, when transmitting the radio signal to the communication terminal 103b, may carry out the null control alone by directing the null to the communication terminal 103d and, when transmitting the radio signal to the communication terminal 103d, carry out the beam control alone by directing the beam to the communication terminal 103d. As described above, since the controller 117 omits the beam control when transmitting the radio signal to the communication terminal 103b and also omits the null control when transmitting the radio signal to the communication terminal 103d, a workload of the controller 117 may be suppressed.

At step S108, further, the controller 117 may perform another transmission control different from those described above. For example, it is assumed that the low-performance communication terminal 103d moves away from the base station 101 and a reception level of the signal from the communication terminal 103d received by the base station 101 becomes lower than that of the communication terminal 103b. In this case, even though the group 2 satisfies the application condition, as the reception level of the signal from the communication terminal 103d becomes lower, the signal from the communication terminal 103d becomes more buried in the signal from the communication terminal 103b. As a result, it becomes difficult for the controller 117 to identify a direction of the communication terminal 103d based on the signal therefrom and thus to accurately direct the null or the beam to the communication terminal 103d. Therefore, the controller 117 may reduce a transmission level (a transmission power) of the signal to the communication terminal 103b and, also, increase the transmission level of the signal to the communication terminal 103d. Thereby, for the communication terminal 103d, the level of the desired wave is increased and the level of the interference wave (the signal to the communication terminal 103b) is reduced. Accordingly, even when the null or the beam is not accurately directed to the communication terminal 103d, the communication terminal 103d is likely to easily perform accurate demodulation.

After the application of the SDMA to the communication terminals 103b and 103d constituting the group 2, the controller 117 carries out operations at step S106 and step S107 for the group 1. Since the group 1 includes no high-performance communication terminal, the controller 117 does not carry out the operation at step S108 for the group 1.

According to the present embodiment, as described above, the controller 117 of the base station 101, based on the information on the communication performance of the communication terminals 103a to 103d, determines whether the communication terminals 103a to 103d have the interference reduction function. Then, the controller 117, since there is the high-performance communication terminal 103b having the interference reduction function, eases the application condition of the SDMA for the high-performance communication terminal 103b. The use of the interference reduction function of the communication terminal 103b may enable the application of the SDMA even when the application of the SDMA is difficult in the communication environment between the communication terminal 103 and the base station 101. Therefore, easing the application condition in consideration of the interference reduction function of the communication terminal 103 widens an application range of the SDMA. As a result, more communication terminals become connectable by using a limited number of radio resources, improving frequency usage efficiency.

According to the present embodiment, also, the controller 117, when applying the SDMA to the group 2 made up of the high-performance communication terminal 103b and the low-performance communication terminal 103d, may perform the null control alone to the low-performance communication terminal 103d in transmission to the high-performance communication terminal 103b, or the beam control alone to the low-functioning communication terminal 103d in transmission thereto. The communication terminal 103b, by using the interference reduction function, is likely to be able to extract the desired wave with stable quality even without the beam control of the desired wave (the signal to the communication terminal 103b) to the communication terminal 103b or without the null control of the interference wave (the signal to the communication terminal 103d). Since the controller 117 does not perform the beam control or the null control, the workload of the controller 117 may be suppressed.

According to the present embodiment, also, the controller 117, when applying the SDMA to the group 2 made up of the high-performing communication terminal 103b and the low-performing communication terminal 103d, may reduce the transmission level of the signal to the high-performing communication terminal 103b and, also, increase the transmission level of the signal to the low-performing communication terminal 103d. The communication terminal 103b, by using the interference reduction function, is likely to be able to extract the desired wave at stable quality even when the level of the desired wave (the signal to the communication terminal 103b) is reduced and thus the desired wave becomes prone to the interference. Also, the communication terminal 103d, since the level of the desired wave (the signal to the communication terminal 103d) is increased and the level of the interference wave (the signal to the communication terminal 103b) is reduced, is likely to easily demodulate the signal.

According to the present embodiment, further, the controller 117, since there are communication terminals 103a to 103d those satisfying the application condition, that is, since there are the group 1 and the group 2, may preferentially apply the SDMA to the high-performance communication terminal 103b (the group 2 that includes the high-performance communication terminal 103b). Thereby, the controller 117 may apply the SDMA to the communication terminal 103b which is highly likely to achieve stable communication that employs the SDMA and to the communication terminal 103d in the group the same as the communication terminal 103b and, when there are remaining radio resources, apply different radio resources to the remaining communication terminals 103a and 103c without applying the SDMA thereto. Thereby, throughput of the entire system may be improved.

As the operation of the base station 101 associated with the SDMA in FIG. 3 described above, the multi-user MIMO has been described in which a plurality of channels are assigned to a plurality of communication terminals 103 by using the same radio resource. However, the operation of the base station 101 in FIG. 3 described above is applicable also to single-user MIMO. For example, in determination on the application order at step S105 in FIG. 3, the controller 117 separates the communication terminals into groups including a group made up of the high-performance communication terminal 103b alone. Next, the controller 117, when the communication terminal 103b satisfies the application condition (Yes at step S106), applies the SDMA to the communication terminal 103b and assigns one radio resource thereto such that the communication terminal 103b carries out the radio communication by using a plurality of channels (step S107). Then, the controller 117, to the high-performance communication terminal 103b, may execute the transmission control other than the transmission directivity control described above (step S108).

Although the disclosure has been described based on the figures and the embodiment, it is to be understood that various modifications and changes may be implemented based on the disclosure herein by those who are ordinarily skilled in the art. Accordingly, such modifications and changes are included in the scope of the disclosure.

For example, functions and the like included in each unit, each means and each step may be rearranged without logical inconsistency, so as to combine a plurality of means or steps together or to divide them.

Although in the above embodiment the another communication apparatus is the communication terminal, the disclosure herein is not limited thereto. For example, when the communication apparatus having a plurality of antennas is the base station, the another communication apparatus may be a relay apparatus or a wireless router those for communicating with the base station.

In the above embodiment, also, technical ideas of expressions such as "equal to or higher than" the threshold (a predetermined value) and "below" the threshold should not be construed in a strict sense but, according to a specification of the base station, may include a meaning either including or excluding a reference value. For example, "equal to or higher than" the threshold (the predetermined value) may mean a comparison object at the threshold (the predetermined value) as well as the comparison object exceeding the threshold (the predetermined value). Also, for example, "lower than" the threshold (the predetermined value) may mean the comparison object below the threshold (the predetermined value) as well as the comparison object at the threshold (the predetermined value), that is, the comparison object equal to or lower than the threshold (the predetermined value).

REFERENCE SIGNS LIST 100 communication system
101 base station (communication apparatus)
103a (low-performance) communication terminal (another communication apparatus)
103b (high-performance) communication terminal (another communication apparatus)
103c (low-performance) communication terminal (another communication apparatus)
103d (low-performance) communication terminal (another communication apparatus)
111 communication unit
113 baseband unit
115 storage unit
117 controller
ANT array antenna

The invention claimed is:

1. A communication apparatus, comprising:
a plurality of antennas; and
a controller, in radio communication with another communication apparatus on a plurality of channels by applying SDMA (Space Division Multiple Access), for acquiring information on communication performance of the another communication apparatus and, based on the information, controlling the radio communication that employs the SDMA,
wherein the controller
based on the information, determines whether the another communication apparatus is a first communication apparatus having an interference reduction function, and
when the another communication apparatus is determined to be the first communication apparatus, eases an application condition of SDMA for the first communication apparatus by changing a certain threshold.

2. The communication apparatus according to claim 1, wherein the controller is in radio communication with a plurality of other communication apparatuses.

3. The communication apparatus according to claim 2, wherein,
when
the plurality of other communication apparatuses includes a second communication apparatus having no interference reduction function, and
a relation between the second communication apparatus and the first communication apparatus satisfies the application condition,
the controller in transmission to the first communication apparatus, carries out null control alone to the second communication apparatus, and in transmission to the second communication apparatus, carries out beam control alone to the second communication apparatus.

4. The communication apparatus according to claim 2, wherein, when
the plurality of other communication apparatuses includes a second communication apparatus having no interference reduction function,
a reception level of a signal from the second communication apparatus is lower than a reception level of a signal from the first communication apparatus, and
a relation between the second communication apparatus and the first communication apparatus satisfies the application condition, the controller
reduces a transmission level of a signal transmitted to the first communication apparatus and, simultaneously, increases a transmission level of a signal transmitted to the second communication apparatus.

5. The communication apparatus according to claim 2, wherein
the application condition is having a difference between reception levels of signals from the plurality of other communication apparatuses smaller than a reception level threshold, and
the controller eases the application condition by increasing the reception level threshold.

6. The communication apparatus according to claim 2, wherein
the application condition is having a cross-correlation of signals from the plurality of other communication apparatuses smaller than a correlation threshold, and
the controller eases the application condition by increasing the correlation threshold.

7. The communication apparatus according to claim 2, wherein, when the plurality of other communication apparatuses satisfies the application condition, the controller preferentially applies the SDMA to the first communication apparatus.

8. The communication apparatus according to claim 1, wherein
the application condition includes a correlation threshold or a reception level threshold, and
the controller eases the application condition of SDMA for the first communication apparatus by increasing the correlation threshold or the reception level threshold within a range that the interference reduction function may deal with.

9. A communication control method performed by a communication apparatus having a plurality of antennas, the method comprising:
when the communication apparatus carries out a radio communication with another communication apparatus on a plurality of channels by applying SDMA (Space Division Multiple Access), the communication apparatus carrying out:
acquiring information on communication performance of the another communication apparatus;
controlling, based on the information, the radio communication that employs the SDMA;
based on the information, determining whether the another communication apparatus is a first communication apparatus having an interference reduction function; and
when the another communication apparatus is determined to be the first communication apparatus, easing an application condition of SDMA for the first communication apparatus by changing a certain threshold.

* * * * *